United States Patent [19]
Drobny

[11] Patent Number: 4,748,806
[45] Date of Patent: Jun. 7, 1988

[54] ATTACHMENT MEANS
[75] Inventor: Lawrence H. Drobny, Old Saybrook, Conn.
[73] Assignee: United Technologies Corporation, Hartford, Conn.
[21] Appl. No.: 751,753
[22] Filed: Jul. 3, 1985
[51] Int. Cl.$^4$ ............................ F02C 7/20; B25G 3/00; F16B 39/00
[52] U.S. Cl. ........................................ 60/39.32; 60/757; 403/259; 403/260; 411/147
[58] Field of Search ............ 60/39.31, 39.32, 722, 60/752, 753, 755, 756, 757, 758, 759, 760; 403/256, 257, 259, 260, DIG. 10; 411/147, 361; 267/147

[56] References Cited
U.S. PATENT DOCUMENTS

| 2,334,263 | 11/1943 | Hartwell | 210/494.2 |
| 2,869,858 | 1/1959 | Hartwell | 267/147 |
| 3,073,557 | 1/1963 | Davis | 267/143 |
| 3,390,709 | 7/1968 | Schmidt | 267/147 |
| 3,932,056 | 1/1976 | Tai | 415/217 |
| 4,302,941 | 12/1981 | Du Bell | 60/757 |
| 4,512,159 | 4/1985 | Memmen | 60/752 |

FOREIGN PATENT DOCUMENTS

| 1176791 | 1/1970 | United Kingdom | 267/147 |
| 1487064 | 9/1977 | United Kingdom | 60/39.32 |

Primary Examiner—Louis J. Casaregola
Assistant Examiner—Timothy S. Thorpe
Attorney, Agent, or Firm—Norman Friedland

[57] ABSTRACT

The liner used in the combustor and other components is fabricated from a cylindrical shell and segmented panels attached to the shell. The attachment includes a self-locking nut and flexible bushing mounted on a post extending from the panel to protrude through a hole formed in a shell, thus permitting assembly in a limited space.

2 Claims, 1 Drawing Sheet

ATTACHMENT MEANS

DESCRIPTION

1. Technical Field

This invention relates to liners for gas turbine engines and particularly to an attachment for securing the panels to its supporting shell of a FLOATWALL TM liner used on the combustor and other components of the engine.

2. Background Art

This invention constitutes an improvement over U.S. Pat. No. 4,302,941 granted to T. L. DuBell on Dec. 1, 1981 entitled "Combustion Liner Construction for Gas Turbine Engine" and assigned to United Technologies Corporation, the same assignee as this patent application. This patent describes and claims a FLOATWALL liner construction which essentially comprises a generally cylindrically shaped shell which has attached thereto a plurality of relatively free floating segmented panels adapted to be displaced axially and circumferentially in response to the thermals of the system. Such designs are capable of withstanding the hostile environment to which they are subjected with improved durability as compared to heretofore known combustor liners.

One of the problems inherent in the FLOATWALL combustor is the attachment of the floating panel segments to the shell. Obviously, in a gas turbine engine application powering aircraft, the attachment must not become dislodged as it may cause damage to the turbine downstream of the combustor and the attachment must be removable without damage to the remaining liner components for maintenance purpose.

U.S. Pat. No. 4,512,159 granted to R. L. Mennen on Apr. 23, 1985 entitled "Clip Attachment", and assigned to the same assignee as this patent application, discloses an alternative scheme. In this configuration a uniquely designed clip fits over the integral post of the panel that passes through an aperture in the shell.

It is, of course, desirable for the fastener to secure the segmented panels to the cooperating support shell in the FLOATWALL combustor configuration that will withstand the hostile environment of a gas turbine engine while yet being capable of being easily removed without injuring the panel's post and/or liner so as to be able to repair the liner.

In another scheme disclosed in an application entitled "Attachment for Combustor Liners and Methods Thereof" filed on even date by R. Dondero and assigned to the same assignee, a swagged collar is utilized. However, this swagging operation requires the use of a swagging tool that necessitates a certain space to operate, and hence has certain fabrication limitations.

DISCLOSURE OF INVENTION

I have found that I can provide a suitable fastener that requires minimum space to fasten while achieving the other characteristics of the fastener necessary to meet the requirements of this hostile environment.

A feature of this invention is a threaded nut (self-locking) that threadably engages the smaller threaded end of a two diameter post that also engages a surrounding flexible bushing sandwiched between the end of the nut and the outer surface of the shell to preload that nut and afford dampening of the assembly. The bottom of the nut shoulders on the larger diameter end to achieve the proper displacement of the flexible bushing. This assures proper loading, damping and allows the segmented panel to move axially and circumferentially relative to the shell.

Other features and advantages will be apparent from the specification and claims and from the accompanying drawings which illustrate an embodiment of the invention.

BEST MODE FOR CARRYING OUT THE INVENTION

While this invention in its preferred embodiment constitutes an improvement on the FLOATWALL liner as described in U.S. Pat. No. 4,302,941, supra and utilized on aircraft engines such as the PW 2037 and V-2500 manufactured by the Pratt and Whitney Group of United Aircraft Corporation, the assignee of this patent application, it is to be understood that the retention system may be employed in other combustor configuration or components of the engine. For example, this invention may be utilized in the transition duct leading the combustion products from the burners to the turbine inlet.

Figure 1:
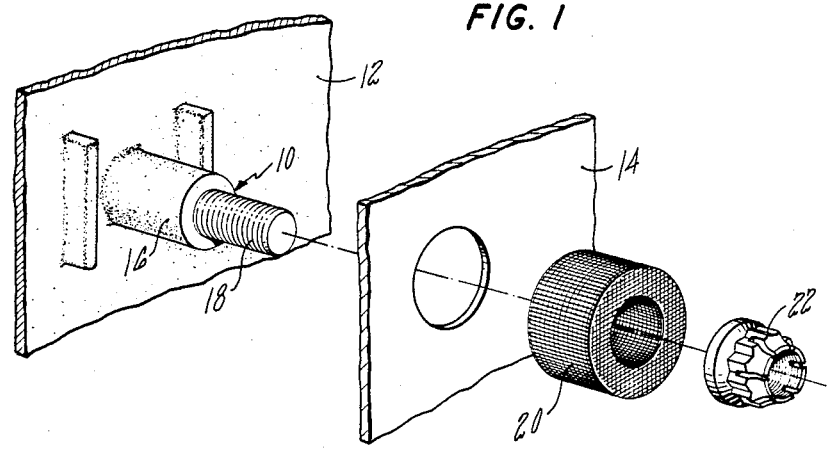
FIG. 1 is an exploded view in perspective of the details of the invention.
Figure 2:
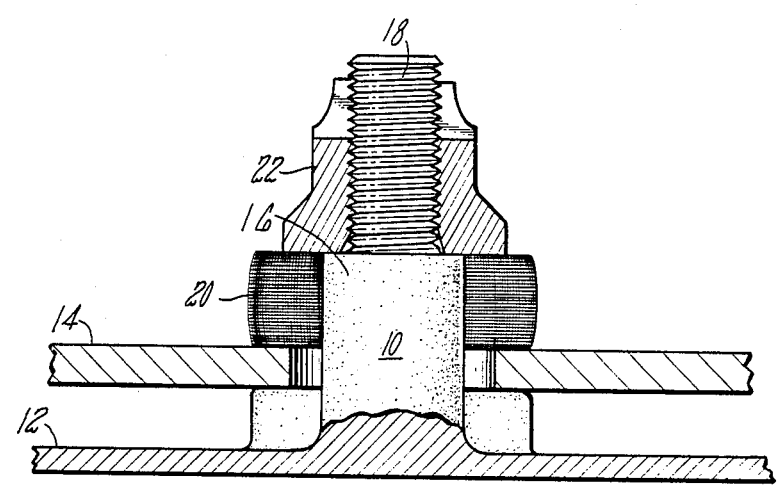
FIG. 2 is a partial view in cross section showing the details of the fastener in the assembled position.

The invention can best be understood by referring to FIGS. 1 and 2 showing the fastener on a FLOATWALL liner configuration. Only a portion of the liner is shown for the sake of convenience and simplicity. However, for details of the liner reference is hereby made to U.S. Pat. No. 4,302,941, supra. As is typical in this construction a post 10 on the back surface of segmented panel 12 extends through an aperture through the shell 14 to secure the panel to the supporting shell. Post 10 has a larger diameter portion 16 and a smaller threaded diameter portion 18 for reason to be described hereinbelow.

A flexible bushing 20, fabricated from a wire mesh of, say, Hastelloy material (any material that can withstand the hostile environment and displays the flexible and resiliency characteristics can be used) surrounds the post 10 and is sandwiched between the end of the nut 22 and the surface of shell 14. The nut 22 is of the self-locking type which is commercially available. A suitable flexible bushing is commercially available from Barry Controls, a unit of Barry Wright of Watertown, Mass.

To assemble, the bushing is simply fitted over the post and the length is designed to be longer than the distance that the larger diameter portion of the post extends beyond the surface of shell 14. So that by tightening nut 22 by the use of a hand operated wrench or the like, the bushing 20 will be compressed and the amount of compression is preset by the distance the nut travels to bottom at the top surface of the larger diameter portion 16 (at the shoulder). This assures the proper preloading on nut 22 and the sliding relationship between shell 14 and segmented panel 12 so that it displaces axially and circumferentially relative to each other during the hot temperatures encountered. The flexible bushing 20 also acts as a dampener.

Hence, by virtue of this invention, the panels can be mounted in a limited space environment, requiring ordinary tools for assembly and disassembly and since the nut is fully loaded it won't back off. Additionally, any variation due to manufacturing of the post and threads will have little effect on the fastener.

It should be understood that the invention is not limited to the particular embodiments shown and described herein, but that various changes and modifications may be made without departing from the spirit and scope of this novel concept as defined by the following claims.

I claim:

1. Attachment means for a liner that includes a generally cylindrically shaped shell and a plurality of axial and circumferential segmented panels mounted in parallel relationship but spaced to permit the flow of cooling air therebetween, including a post extending radially from the panel through an aperture formed in said shell extending beyond the surface of said shell, said post having a larger diameter portion extending a predetermined distance from said shell and a smaller diameter threaded portion adjacent said larger diameter portion, a self-locking nut adapted to be threaded to said threaded portion of said post to bottom the top surface of said larger diameter portion of said post, a flexible resilient wire cylindrically shaped bushing surrounding said larger diameter portion between said surface of said shell and said self-locking nut, said flexible resilient wire cylindrically shaped bushing being dimensioned so that it extends beyond the larger diameter portion in the unthreaded position so that displacement of said self-locking nut to secure said panel to said shell compresses said bushing a predetermined amount, said flexible resilient wire cylindrically shaped bushing having an upper face for receiving said self-locking nut and an under face for overlying a portion of said cylindrically shaped shell, whereby the panels are movable axially and circumferentially relative to said shell when expanded due to thermals and said bushing preloads said nut, and self-locking nut includes an upper slotted portion that forms fingers that applies a radial force to said post when in the threaded position.

2. Attachment means as in claim 1 wherein said flexible, resilient cylindrically shaped wire bushing is fabricated from Hastelloy X material.

* * * * *